(12) United States Patent
Kan-o

(10) Patent No.: US 6,910,217 B2
(45) Date of Patent: Jun. 21, 2005

(54) DISK DRIVE UNIT HAVING A SCRATCH PREVENTION DEVICE AND INFORMATION PROCESSING DEVICE CONTAINING THE DISK DRIVE UNIT

(75) Inventor: Toshiaki Kan-o, Yamagata (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 09/972,951

(22) Filed: Oct. 10, 2001

(65) Prior Publication Data

US 2002/0044517 A1 Apr. 18, 2002

(30) Foreign Application Priority Data

Oct. 13, 2000 (JP) ........................................ 2000-314199

(51) Int. Cl.⁷ .............................................. G11B 17/02
(52) U.S. Cl. ........................................................ 720/646
(58) Field of Search ................................ 720/646, 647, 720/655; 369/75.1, 77.1; 206/308.1, 313

(56) References Cited

U.S. PATENT DOCUMENTS 5,022,519 A * 6/1991 Iwasa et al. ................ 206/313
5,220,552 A * 6/1993 Yokoi et al. ................ 720/646
5,300,763 A * 4/1994 Ito et al. ..................... 235/475
5,355,358 A * 10/1994 Van Alfen .................. 720/647
6,411,583 B1 * 6/2002 Yamamoto et al. ......... 720/647

FOREIGN PATENT DOCUMENTS

| JP | 60-166859 | | 11/1985 |
|----|-----------|---|---------|
| JP | 63-187492 | * | 8/1988 |
| JP | 6-43899 | | 6/1994 |
| JP | 3025136 | | 3/1996 |
| JP | 8-269909 | | 10/1996 |
| JP | 11-306630 | | 11/1999 |
| JP | 2000-298906 | * | 10/2000 |

* cited by examiner

Primary Examiner—Brian E. Miller
(74) Attorney, Agent, or Firm—Young & Thompson

(57) ABSTRACT

In a disk drive unit in which a felt member for concealment is provided in the vicinity of a disk insertion and discharge slot into and from which a disk medium is inserted and discharged and a slit for insertion of the disk medium is provided in the felt member along the longitudinal direction of the disk insertion and discharge slot, a plurality of slits are provided in a direction perpendicular to the slit.

23 Claims, 8 Drawing Sheets

SCRATCH PREVENTION PANEL STRUCTURE

TURNING-OVER OCCURS AT VERTICAL SLIT PORTION

SCRATCH PREVENTION PANEL STRUCTURE

CONVENTIONAL PANEL STRUCTURE

DISK DRIVE UNIT HAVING A SCRATCH PREVENTION DEVICE AND INFORMATION PROCESSING DEVICE CONTAINING THE DISK DRIVE UNIT

BACKGROUND OF THE INVENTION

1. Field of the Invention

The present invention relates to a disk drive unit and an information processing device and, more particularly, to a disk drive unit which facilitates insertion and discharge of such disks as a DVD-ROM disk and a CD-ROM disk and to an information processing device using the same.

2. Description of the Related Art

Many conventional information processing devices employ disk drive units such as a DVD-ROM drive unit and a CD-ROM drive unit which can be automatically inserted and discharged, and a disk insertion and discharge slot of a DVD-ROM drive unit is in many cases mounted with a panel for a drive unit unique to a manufacturer.

When a new disk medium whose outer peripheral portion is too roughly finished with a coarse edge is inserted into a conventional DVD-ROM drive unit which can be automatically inserted and discharged, there occurs a case where the disk is caught by a felt member for dust prevention, concealment provided in the vicinity of a disk insertion and discharge slot when the disk pushes to open and pass through a slit of the felt member. Then, there is a case where catching resistance between the disk and the felt member is larger than medium discharging force of the DVD-ROM drive unit and in this case, the disk will not be discharged but return into the drive unit again or it will stop halfway.

In such a case, further trouble would occur that when a disk is drawn by hand to discharge from a disk unit, a disk data surface might come into contact with an insertion and discharge slot to cause scratches, thereby inviting danger of disabling data read.

SUMMARY OF THE INVENTION

An object of the present invention is provide a novel disk drive unit or information processing device which enables improvement in the above-described problems of conventional disk drive units and prevents troubles from occurring when a disk is inserted into or discharged from the device.

Another object of the present invention is to provide a novel disk drive unit or information processing device which prevents a disk from having scratches when inserted into or discharged from the device.

According to the first aspect of the invention, a disk drive unit with which a disk medium is to be mounted for access, wherein in the vicinity of a disk insertion and discharge slot of a panel into and from which the disk medium is inserted and discharged, a felt member for concealment is provided which has a slit for insertion of the disk medium along a longitudinal direction of the discharge slot, and a plurality of slits are provided for every predetermined interval in a direction perpendicular to the slit of the felt member.

In the preferred construction of the disk drive unit, a member for preventing scratches of the disk medium is provided at an edge portion of the disk insertion and discharge slot so as to face the disk medium.

In another preferred construction of the disk drive unit, the scratch prevention member is formed to be convex and is disposed at the edge portion of the disk insertion and discharge slot so as to slightly project to the side of the disk insertion and discharge slot so that only a part of a data surface of the disk medium comes into contact with the scratch prevention member.

In another preferred construction of the disk drive unit, the scratch prevention member is a roller ratably disposed at the panel and is disposed at the edge portion of the disk insertion and discharge slot so as to slightly project to the side of the disk insertion and discharge slot so that only a part of a data surface of the disk medium comes into contact with the scratch prevention member.

In another preferred construction of the disk drive unit, the scratch prevention member is formed of a material whose hardness is lower than hardness of the disk medium.

According to the second aspect of the invention, a disk drive unit with which a disk medium is to be mounted for access, wherein a member for preventing scratches of the disk medium is provided at an edge portion of a disk insertion and discharge slot into and from which the disk medium is inserted and discharged so as to face the disk medium.

In the preferred construction of the disk drive unit, the scratch prevention member is formed to be convex and is disposed at the edge portion of the disk insertion and discharge slot so as to slightly project to the side of the disk insertion and discharge slot so that only a part of a data surface of the disk medium comes into contact with the scratch prevention member.

In another preferred construction of the disk drive unit, the scratch prevention member is a roller ratably disposed at the panel and is disposed at the edge portion of the disk insertion and discharge slot so as to slightly project to the side of the disk insertion and discharge slot so that only a part of a data surface of the disk medium comes into contact with the scratch prevention member.

In another preferred construction of the disk drive unit, the scratch prevention member is formed of a material whose hardness is lower than hardness of the disk medium.

According to the third aspect of the invention, in a disk drive unit with which a disk medium is to be mounted for access, a panel structure having a disk insertion and discharge slot into and from which the disk medium is inserted and discharged, wherein in the vicinity of the disk insertion and discharge slot of a panel into and from which the disk medium is inserted and discharged, a felt member for concealment is provided which has a slit for insertion of the disk medium along a longitudinal direction of the discharge slot, and a plurality of slits are provided for every predetermined interval in a direction perpendicular to the slit of the felt member.

In the preferred construction of the panel structure of a disk drive unit, a member for preventing scratches of the disk medium is provided at an edge portion of the disk insertion and discharge slot so as to face the disk medium.

In another preferred construction of the panel structure of a disk drive unit, the scratch prevention member is formed to be convex and is disposed at the edge portion of the disk insertion and discharge slot so as to slightly project to the side of the disk insertion and discharge slot so that only a part of a data surface of the disk medium comes into contact with the scratch prevention member.

In another preferred construction of the panel structure of a disk drive unit, the scratch prevention member is a roller ratably disposed at the panel and is disposed at the edge portion of the disk insertion and discharge slot so as to slightly project to the side of the disk insertion and discharge slot so that only a part of a data surface of the disk medium comes into contact with the scratch prevention member.

In another preferred construction of the panel structure of a disk drive unit, the scratch prevention member is formed of a material whose hardness is lower than hardness of the disk medium.

According to another aspect of the invention, an information processing device having a disk drive unit with which a disk medium is to be mounted for access, wherein in the vicinity of a disk insertion and discharge slot of a panel in the disk drive unit into and from which the disk medium is inserted and discharged, a felt member for concealment is provided which has a slit for insertion of the disk medium along a longitudinal direction of the discharge slot, and a plurality of slits are provided for every predetermined interval in a direction perpendicular to the slit of the felt member.

In the preferred construction of the information processing device having a disk drive unit, a member for preventing scratches of the disk medium is provided at an edge portion of the disk insertion and discharge slot in the disk drive unit so as to face the disk medium.

In another preferred construction of the information processing device having a disk drive unit, the scratch prevention member is formed to be convex and is disposed at the edge portion of the disk insertion and discharge slot so as to slightly project to the side of the disk insertion and discharge slot so that only a part of a data surface of the disk medium comes into contact with the scratch prevention member.

In another preferred construction of the information processing device having a disk drive unit, the scratch prevention member is a roller ratably disposed at the panel and is disposed at the edge portion of the disk insertion and discharge slot so as to slightly project to the side of the disk insertion and discharge slot so that only a part of a data surface of the disk medium comes into contact with the scratch prevention member.

In another preferred construction of the information processing device having a disk drive unit, the scratch prevention member is formed of a material whose hardness is lower than hardness of the disk medium.

According to a further aspect of the invention, an information processing device having a disk drive unit with which a disk medium is mounted for access, wherein a member for preventing scratches of the disk medium is provided at an edge portion of a disk insertion and discharge slot in a panel of the disk drive unit into and from which the disk medium is inserted and discharged so as to face the disk medium.

In the preferred construction of the information processing device having a disk drive unit, the scratch prevention member is formed to be convex and is disposed at the edge portion of the disk insertion and discharge slot so as to slightly project to the side of the disk insertion and discharge slot so that only a part of a data surface of the disk medium comes into contact with the scratch prevention member.

In another preferred construction of the information processing device having a disk drive unit, the scratch prevention member is a roller ratably disposed at the panel and is disposed at the edge portion of the disk insertion and discharge slot so as to slightly project to the side of the disk insertion and discharge slot so that only a part of a data surface of the disk medium comes into contact with the scratch prevention member.

In another preferred construction of the information processing device having a disk drive unit, the scratch prevention member is formed of a material whose hardness is lower than hardness of the disk medium.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
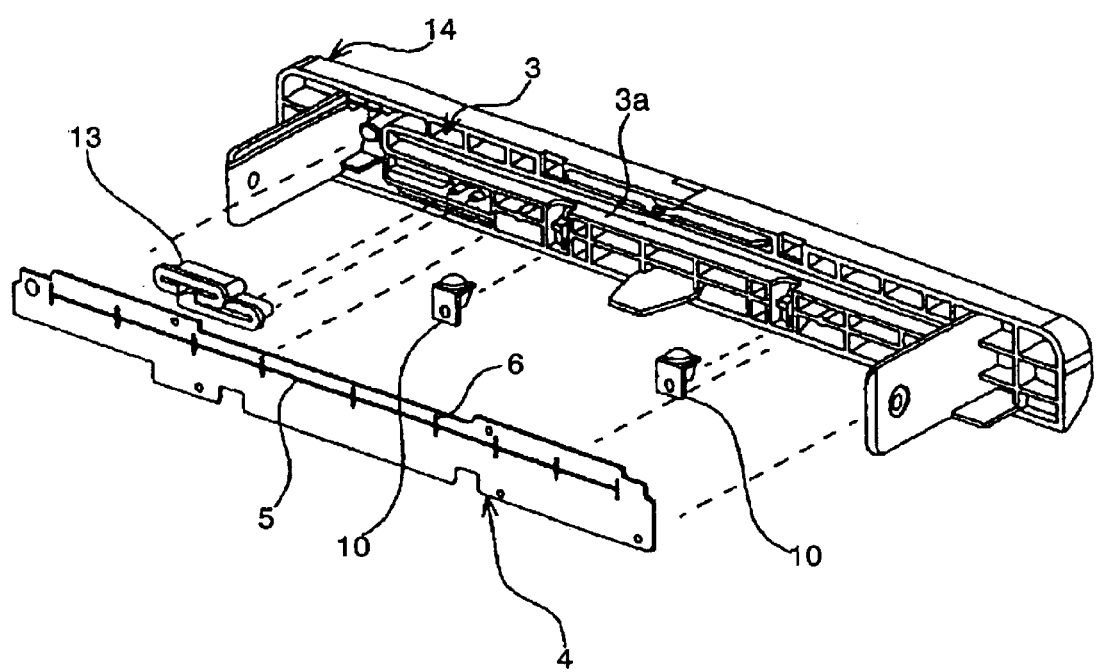
FIG. 1 is an exploded perspective view of a panel portion of a disk drive unit according a first embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

With vertical slits provided in a felt member for the insertion and discharge of a disk medium which is disposed at a panel located at the front side of a disk drive unit to enable the felt member to turn over with ease so that the disk medium is allowed to push and open the felt member with ease, thereby decreasing catching resistance between the disk medium and the felt member as much as possible, the present invention enables insertion and discharge of a disk medium to be conducted with ease and reliably.

In addition, with a protrusion for scratch prevention provided on the panel of the disk drive unit to prevent a data surface of the disk medium from coming into contact with other portions than the protrusion, the data surface of the disk medium is free from scratches.

In the following, embodiments of a disk drive unit and an information processing device according to the present invention will be described in detail with reference to the drawings.

(First Embodiment)

FIGS. 1 to 4, 6, 7 and 9 are views showing a structure of a first embodiment of a disk drive unit according to the present invention. Shown in these figures is a disk drive unit 2 having a cloth member (felt member) 4 for concealment disposed in the vicinity of a disk insertion and discharge slot 3 through which a disk medium 1 such as a DVD-ROM disk is inserted and discharged into and from the disk drive unit 2 and having a slit 5 provided in the felt member 4 through which slit the disk medium 1 is inserted in the longitudinal direction of the discharge slot 3, in which a plurality of slits 6 are disposed for every predetermined interval in a direction perpendicular to the slit 5.

In addition, a patch 10 for scratch prevention having a convex portion 9 is provided at an edge portion 3a of the disk insertion and discharge slot 3 so as to face the disk medium 1. In this case, the convex portion 9 of the patch 10 for scratch prevention is formed to come into contact only with a part of a data surface of the disk medium 1.

In the following, the first embodiment will be described in more detail.

Figure 2:
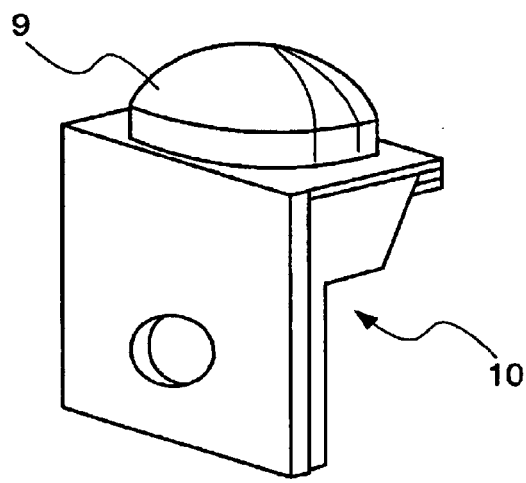
FIG. 2 is an expanded view of a patch to be fit in the panel of the disk drive unit according to the first embodiment of the present invention.

The disk drive unit according to the first embodiment, as shown in FIGS. 1 and 2, includes the patch 10 for preventing scratches of the disk medium 1 such as a DVD-ROM disk on which patch the convex portion 9 is formed, the felt member 4 for dust prevention/concealment, an operation button 13 for discharging the disk medium 1 and a panel 14 for incorporating these components.

FIG. 2 is an expanded view of the patch 10 for preventing scratches of the disk medium 1. Formed on a medium contact surface of the patch 10 for preventing scratches of the disk medium 1 is the spherical convex portion 9. The patch 10 for scratch prevention is formed of a material whose hardness is lower than that of the disk medium 1 such as a DVD-ROM disk in order to be less likely to be deformed and to be scratched when force is applied and is attached to the edge portion 3a of the disk insertion and discharge slot 3 of the panel 14 so as to face the disk medium 1.

Figure 3:
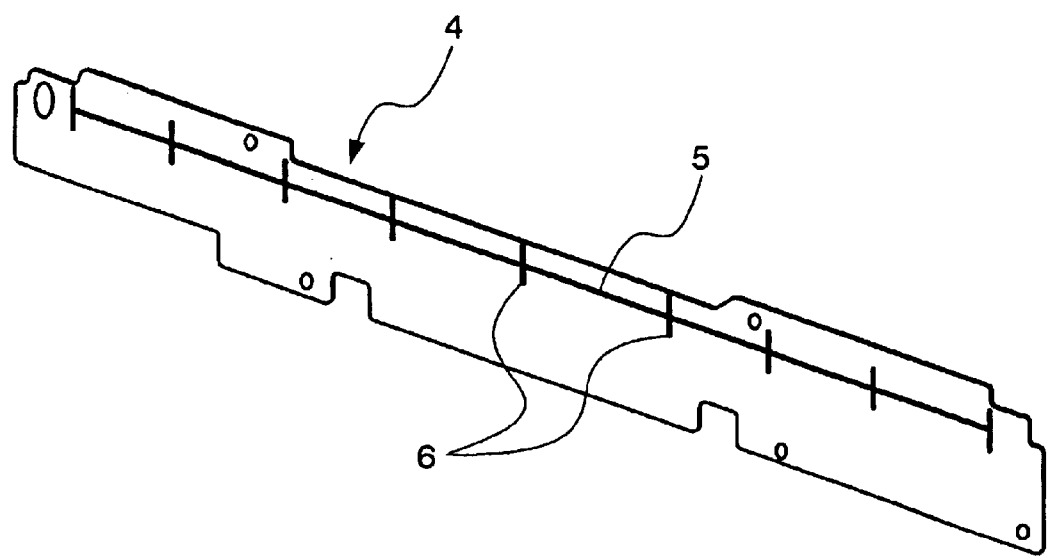
FIG. 3 is an expanded view of a felt member to be attached to the panel of the disk drive unit according to the first embodiment of the present invention.

FIG. 3 is an expanded view of the felt member 4 for dust prevention/concealment. The felt member 4 includes the long horizontal slit 5 for disk insertion and the plurality of vertical slits 6 perpendicular to the horizontal slit 5 and is attached to the back surface of the disk insertion and discharge slot 3 of the panel 14 by a double adhesive tape.

The purpose of the provision of the vertical slits 6 provided in the felt member 4 is to facilitate falling of the felt member 4 toward the moving direction of the disk medium 1 and to make catching resistance between the disk medium 1 and the felt member 4 be smaller than the medium discharging force of the DVD-ROM disk drive unit when the disk medium 1 pushes to open and pass through the horizontal slit 5 of the felt member 4. It is clear that provision of the vertical slits 6 will not spoil dust prevention and concealment effects.

Figure 4:
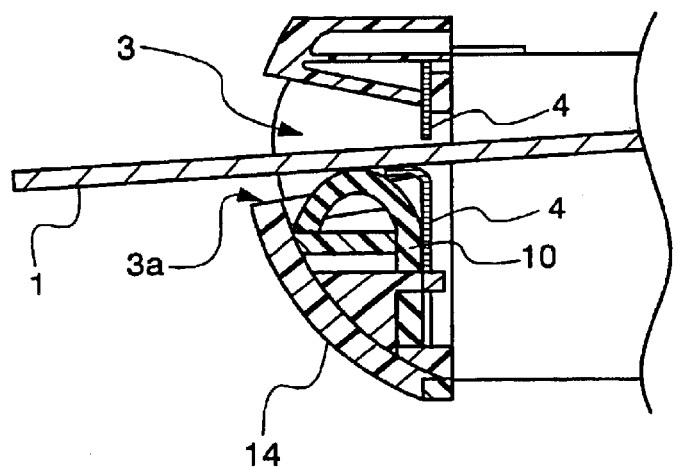
FIG. 4 is a sectional view of the panel portion of the disk drive unit according to the first embodiment of the present invention.

FIG. 4 is a sectional view of a part of the disk insertion and discharge slot 3 of the panel 14 in which the patch 10 for scratch prevention is fit. As shown in FIG. 4, the patch 10 is attached such that the spherical convex portion 9 of the patch 10 for preventing scratches of the disk medium 1 slightly projects from the edge portion 3a of the discharge slot 3 of the panel 4 and such that when the disk medium 1 bends over from the normal position (e.g. horizontal state) at the insertion or discharge of the disk medium 1, only a part of the data surface of the disk medium 1 comes into contact with the convex portion 9 to prevent contact of the entire data surface of the disk medium 1 with the edge portion 3a of the discharge slot 3.

Figure 5:
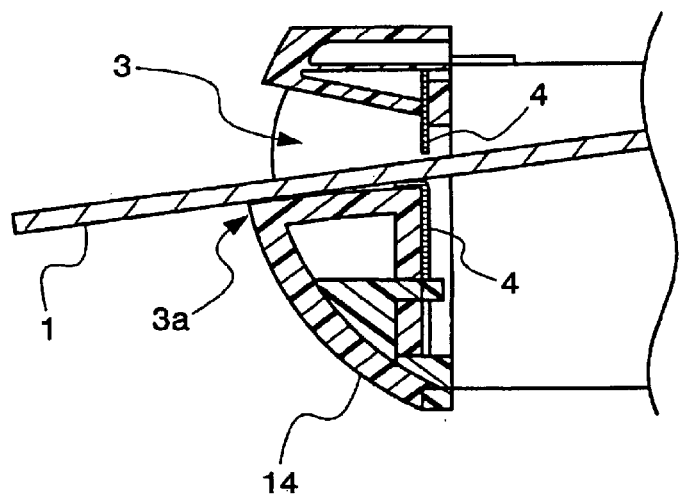
FIG. 5 is a sectional view of a panel portion of a conventional disk drive unit.

On the other hand, in a case of a conventional panel structure, as shown in FIG. 5, because of lack of the patch 10 for scratch prevention, when the disk medium 1 deviates from the normal position at the insertion or discharge of the disk, the data surface of the disk medium 1 comes into direct contact with the edge portion 3a of the insertion and discharge slot 3 of the panel 4, which causes scratches on the data surface of the disk medium 1.

Figure 6:
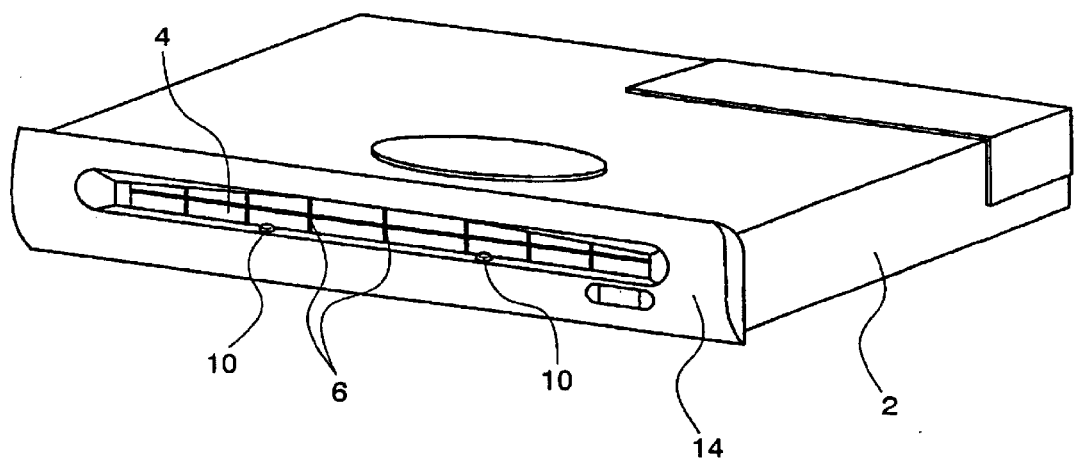
FIG. 6 is a perspective view of the disk drive unit according to the first embodiment of the present invention.

FIG. 6 is a view showing a state where the above-described panel 14 having scratch prevention means according to the present embodiment is attached to the disk drive unit 2 such as a DVD-ROM. The felt member 4 disposed at the insertion and discharge slot 3 is provided with the vertical slits 6 and has the patch 10 for preventing scratches of a disk.

Figure 7:
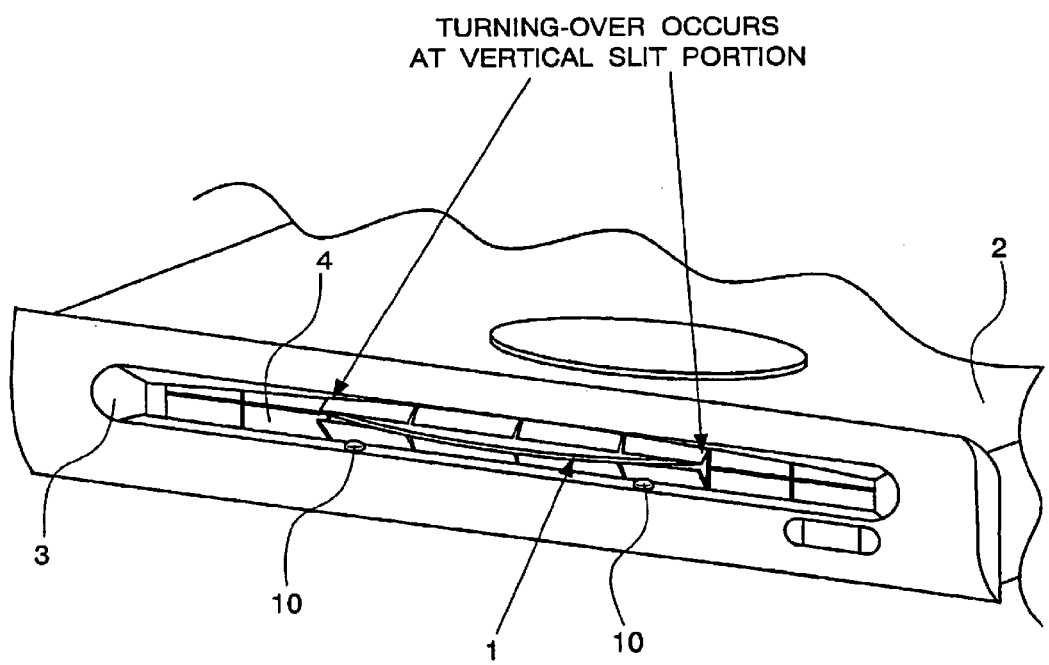
FIG. 7 is a perspective view for use in explaining a state where the disk drive unit according to the first embodiment of the present invention discharges a disk medium.
Figure 8:
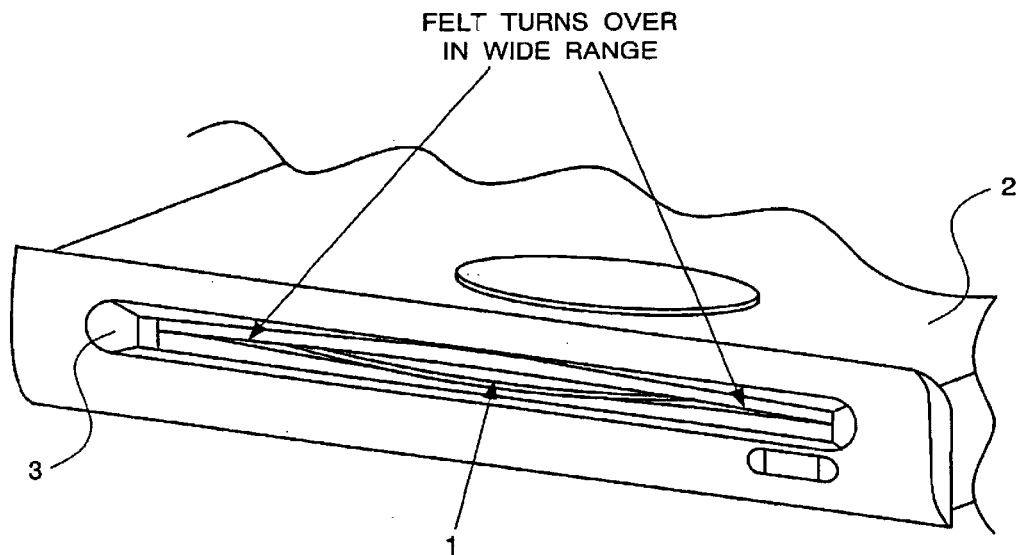
FIG. 8 is a perspective view for use in explaining a state where a conventional disk drive unit discharges a disk medium.

FIGS. 7 and 8 are views showing a state where a disk medium is on the way to discharge from the disk drive unit according to the present invention and from a conventional disk drive unit.

In a case of the disk drive unit shown in FIG. 7, at the discharge of the disk medium 1, when the disk medium 1 pushes to open and pass through the felt member 4, the felt member 4 bends at a part of the vertical slit portion 6 to suppress a wide range of turning-over of the felt member 4 because of the effects of the vertical slits 6 formed in the felt member 4.

On the other hand, in a case of the conventional disk drive unit shown in FIG. 8, in spite of the position of the disk medium 1 being the same as that in FIG. 7, at the discharge of the disk medium 1, turning-over of the felt member 4 is caused in a wide range because the felt member 4 has no vertical slit.

When the felt member 4 turns over at the outer periphery of the disk medium 1, because of a combination with a new medium which makes the outer periphery (edge) coarse, the coarse part and the turned over part cause frictional resistance to result such that the coarse part catches on the felt. In some cases that catch of the disk medium 1 and the felt member 4 becomes larger than medium discharging force, causing such troubles as described above to occur.

Figure 9:
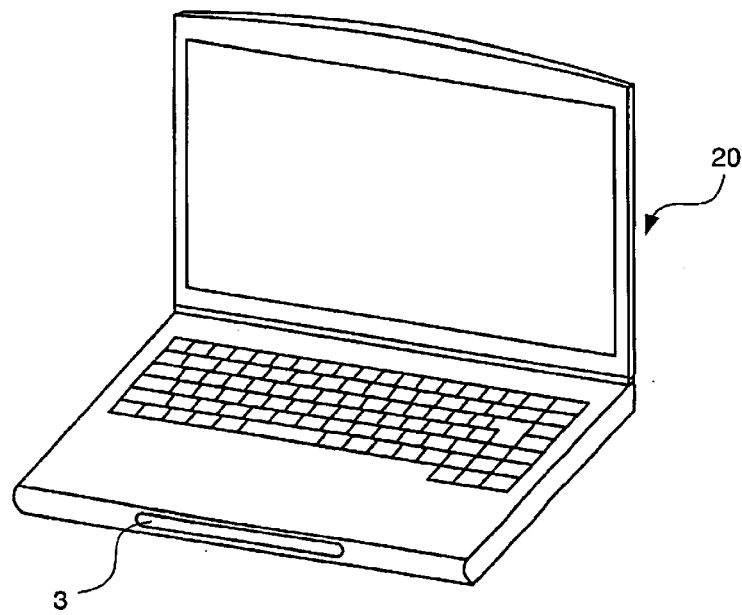
FIG. 9 is a perspective view of a notebook-sized personal computer to which the disk drive unit of the present invention is applied.

FIG. 9 is a view showing a notebook-sized personal computer 20 which is one example of an information processing device using the disk drive unit of the present invention. It is clear that the present invention is also applicable to a stationary information processing device (e.g. desk-top computer).

(Second embodiment)

Figure 10:
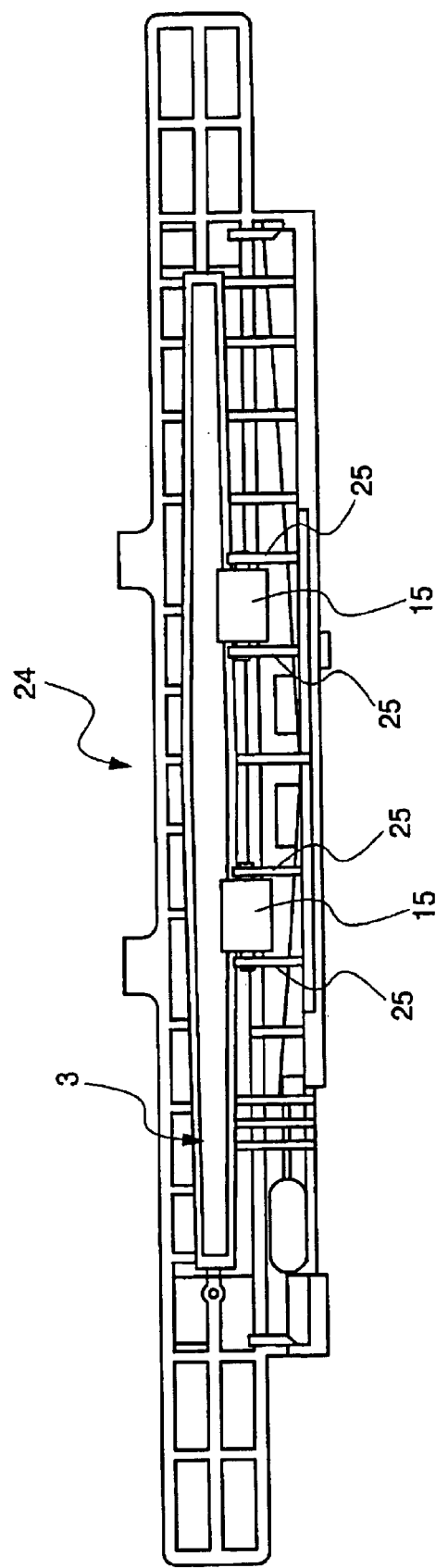
FIG. 10 is a plan view of a panel portion of a disk drive unit according to a second embodiment of the present invention.
Figure 11:
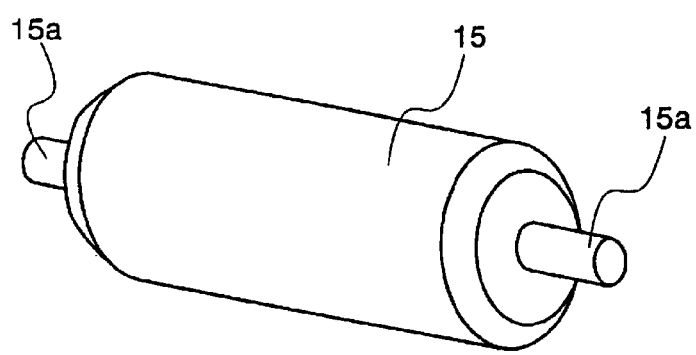
FIG. 11 is a perspective view of a roller for use in the second embodiment of the present invention.
Figure 12:
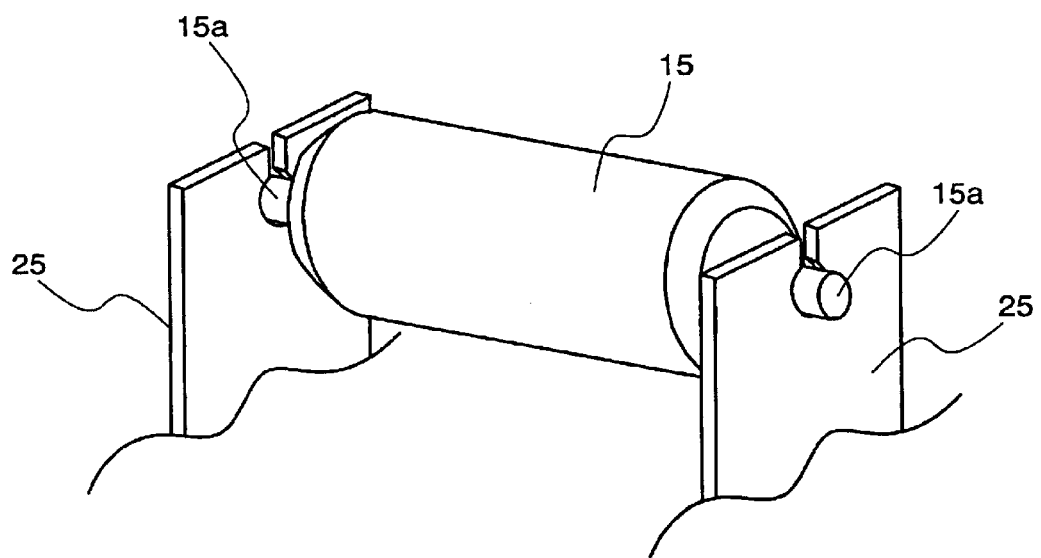
FIG. 12 is a view showing a bearing structure of a roller for use in the second embodiment of the present invention.

FIGS. 10 to 12 are views showing a structure of a disk drive unit according to a second embodiment of the present invention. According the present embodiment, a disk drive unit, which is provided with the disk insertion and discharge slot 3 for inserting and discharging the disk medium 1, is structured to have a rotatable roller 15 in the vicinity of the edge portion 3a of the disk insertion and discharge slot 3 so as to face the disk medium 1 such that the roller 15 comes into contact only with a part of the disk 1.

Also in this case, the roller 15 is designed to come into contact only with a part of the data surface of the disk medium 1.

More specifically, in the second embodiment shown in FIG. 10, the patch 10 for scratch prevention in the first embodiment is replaced by the roller 15. The remaining components have the same structure as those of the first embodiment.

FIG. 11 is an expanded view of the roller 15 for scratch prevention. The roller 15 for scratch prevention has rotary shafts 15a at the opposite sides thereof so that the shaft 15a is attached to a panel 24. The roller is formed of a material whose hardness is lower than that of the disk medium 1 to be less likely to have scratches. FIG. 12 shows a state where the roller 15 is rotatably supported by a bearing portion 25 provided in the panel 24.

Figure 13:
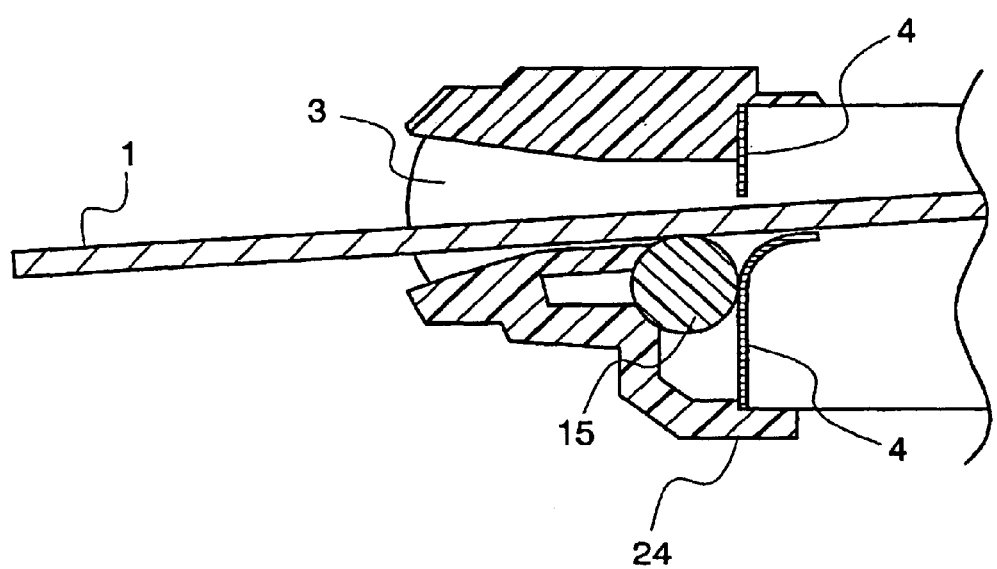
FIG. 13 is a sectional view of the panel of the disk drive unit according to the second embodiment of the present invention.

FIG. 13 is a sectional view of the part of the roller 15 at the disk insertion and discharge slot 3 in the panel 24. In the disk drive unit using the roller 15 according to the second embodiment, the roller 15 is attached to slightly project from the edge portion 3a of the disk insertion and discharge slot 3 in the panel 24 such that when the disk medium 1 deviates from a normal position at the insertion or discharge of the disk medium 1, the disk medium 1 comes into contact with the roller 15 and not the discharge slot directly, thereby protecting the data surface of the disk 1.

At the insertion or discharge of the disk medium 1, when the disk medium 1 comes into contact with the roller 15, the roller 15 rotates centered around the shaft 15a so as to follow the movement of the disk 1, whereby the data surface of the disk medium 1 will have no scratch caused by friction.

Since in the second embodiment, the disk medium 1 is inserted or discharged along the rotation of the roller 15, insertion and discharge of the disk medium 1 can be conducted more smoothly without resistance.

Being thus structured, the disk drive unit according to the present invention produces the following effects.

First effect is that even in a case where a new medium whose outer periphery is too roughly finished to make the edge sandy is inserted into a disk drive unit which can be automatically inserted and discharged such as a DVD-ROM disk, when the disk medium pushes to open and pass through a felt member of a drive panel disposed at a disk insertion and discharge slot, because catch between the disk medium and the felt member will not be larger than medium discharging force of the disk drive unit, there occurs no troubles that the disk is not discharged but return into the drive unit again and that it is stopped halfway.

The reason is that because of the effects of the vertical slits provided in the felt member, when the disk medium pushes to open and pass through the felt member, the felt member bends at a part of the vertical slit to suppress a wide range of turning over of the felt member.

Second effect is that a patch for preventing scratches on a medium provided at the panel of the disk drive unit hinders the medium from coming into contact with other parts than the patch, thereby preventing a trouble that a data surface of the disk medium is scratched.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A disk drive unit with which a disk medium is to be mounted for access, wherein
   in the vicinity of a disk insertion and discharge slot of a panel into and from which said disk medium is inserted and discharged, a felt member for concealment is provided which has a slit for insertion of the disk medium along a longitudinal direction of said discharge slot, and
   a plurality of slits are provided for every predetermined interval in a direction perpendicular to said slit of said felt member.

2. The disk drive unit as set forth in claim 1, wherein a member for preventing scratches of said disk medium is provided at an edge portion of said disk insertion and discharge slot so as to face said disk medium.

3. The disk drive unit as set forth in claim 2, wherein said scratch prevention member is formed to be convex and is disposed at the edge portion of said disk insertion and discharge slot so as to slightly project to the side of said disk insertion and discharge slot so that only a part of a data surface of said disk medium comes into contact with the scratch prevention member.

4. The disk drive unit as set forth in claim 2, wherein said scratch prevention member is a roller rotably disposed at said panel and is disposed at the edge portion of said disk insertion and discharge slot so as to slightly project to the side of said disk insertion and discharge slot so that only a part of a data surface of said disk medium comes into contact with the scratch prevention member.

5. The disk drive unit as set forth in claim 2, wherein said scratch prevention member is formed of a material whose hardness is lower than hardness of said disk medium.

6. The disk drive unit as claimed in claim 1, wherein said plural slits are provided between ends of said felt member.

7. A disk drive unit with which a disk medium is to be mounted for access,
   wherein a member for preventing scratches of said disk medium projects from an edge portion of a disk insertion and discharge slot into and from which said disk medium is inserted and discharged so as to face said disk medium, and
   wherein said scratch prevention member is formed to be convex and is disposed at the edge portion of said disk insertion and discharge slot so as to slightly project to the side of said disk insertion and discharge slot so that only a part of a data surface of said disk medium comes into contact with the scratch prevention member.

8. The disk drive unit as set forth in claim 7, wherein said scratch prevention member is a roller rotatably disposed at said panel and is disposed at the edge portion of said disk insertion and discharge slot so as to slightly project to the side of said disk insertion and discharge slot so that only a part of a data surface of said disk medium comes into contact with the scratch prevention member.

9. In a disk drive unit with which a disk medium is to be mounted for access, a panel structure having a disk insertion and discharge slot into and from which said disk medium is inserted and discharged, wherein in the vicinity of the disk insertion and discharge slot of a panel into and from which said disk medium is inserted and discharged, a felt member for concealment is provided which has a slit for insertion of the disk medium along a longitudinal direction of said discharge slot, and a plurality of slits are provided for every predetermined interval in a direction perpendicular to said slit of said felt member.

10. The panel structure of a disk drive unit as set forth in claim 9, wherein a member for preventing scratches of said disk medium extends from an edge portion of said disk insertion and discharge slot so as to face said disk medium.

11. The panel structure of a disk drive unit as set forth in claim 10, wherein said scratch prevention member is formed to be convex and is disposed at the edge portion of said disk insertion and discharge slot so as to slightly project to the side of said disk insertion and discharge slot so that only a part of a data surface of said disk medium comes into contact with the scratch prevention member.

12. The panel structure of a disk drive unit as set forth in claim 10, wherein said scratch prevention member is a roller rotatably disposed at said panel and is disposed at the edge portion of said disk insertion and discharge slot so as to slightly project to the side of said disk insertion and discharge slot so that only a part of a data surface of said disk medium comes into contact with the scratch prevention member.

13. The panel structure of a disk drive unit as set forth in claim 10, wherein said scratch prevention member is formed of a material whose hardness is lower than hardness of said disk medium.

14. The panel structure as claimed in claim 9, wherein said plural slits are provided between ends of said felt member.

15. An information processing device having a disk drive unit with which a disk medium is to be mounted for access, wherein in the vicinity of a disk insertion and discharge slot of a panel in said disk drive unit into and from which said disk medium is inserted and discharged, a felt member for concealment is provided which has a slit for insertion of the disk medium along a longitudinal direction of said discharge slot, and a plurality of slits are provided for every predetermined interval in a direction perpendicular to said slit of said felt member.

16. The information processing device as set forth in claim 15, wherein a member for preventing scratches of said disk medium extends from an edge portion of said disk insertion and discharge slot in said disk drive unit so as to face said disk medium.

17. The information processing device as set forth in claim 16, wherein said scratch prevention member is formed to be convex and is disposed at the edge portion of said disk insertion and discharge slot so as to slightly project to the side of said disk insertion and discharge slot so that only a part of a data surface of said disk medium comes into contact with the scratch prevention member.

18. The information processing device as set forth in claim 16, wherein said scratch prevention member is a roller rotatably disposed at said panel and is disposed at the edge portion of said disk insertion and discharge slot so as to slightly project to the side of said disk insertion and discharge slot so that only a part of a data surface of said disk medium comes into contact with the scratch prevention member.

19. The information processing device as set forth in claim 16, wherein said scratch prevention member is formed of a material whose hardness is lower than hardness of said disk medium.

20. The information processing device as claimed in claim 15, wherein said plural slits are provided between ends of said felt member.

21. An information processing device having a disk drive unit with which a disk medium is mounted for access, wherein a member for preventing scratches of said disk medium projects from an edge portion of a disk insertion and discharge slot in a panel of said disk drive unit into and from which said disk medium is inserted and discharged so as to face said disk medium, and wherein said scratch prevention member is formed to be convex and is disposed at the edge portion of said disk insertion and discharge slot so as to slightly project to the side of said disk insertion and discharge slot so that only a part of a data surface of said disk medium comes into contact with the scratch prevention member.

22. The information processing device as set forth in claim 21, wherein said scratch prevention member is a roller rotatably disposed at said panel and is disposed at the edge portion of said disk insertion and discharge slot so as to slightly project to the side of said disk insertion and discharge slot so that only a part of a data surface of said disk medium comes into contact with the scratch prevention member.

23. The information processing device as set forth in claim 21, wherein said scratch prevention member is formed of a material whose hardness is lower than hardness of said disk medium.

* * * * *